United States Patent
Suyama et al.

(10) Patent No.: US 6,949,882 B2
(45) Date of Patent: Sep. 27, 2005

(54) VEHICLE LIGHT CONTROLLER

(75) Inventors: Terumasa Suyama, Aichi (JP); Takashi Ichikawa, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 93 days.

(21) Appl. No.: 10/723,007

(22) Filed: Nov. 26, 2003

(65) Prior Publication Data

US 2004/0104815 A1 Jun. 3, 2004

(30) Foreign Application Priority Data

Nov. 28, 2002 (JP) ........................................ 2002-344975

(51) Int. Cl.[7] ............................. B60Q 1/00; B60Q 1/26; B60R 25/10
(52) U.S. Cl. .............................. 315/77; 315/76; 315/82; 340/426.16; 340/908
(58) Field of Search ......................... 315/76, 77, 78, 315/79, 80, 82–84; 340/426.16, 908, 932.2; B60Q 1/00, 1/26; B60R 25/10

(56) References Cited

U.S. PATENT DOCUMENTS 6,474,853 B2 * 11/2002 Pastrick et al. ............. 362/494
6,861,809 B2 * 3/2005 Stam ........................... 315/82
2004/0016870 A1 * 1/2004 Pawlicki et al. .......... 250/208.1

FOREIGN PATENT DOCUMENTS

JP    10-35359 A    2/1998

* cited by examiner

*Primary Examiner*—Trinh Vo Dinh
(74) *Attorney, Agent, or Firm*—Crompton, Seager & Tufte, LLC

(57) ABSTRACT

A vehicle light controller that facilitates recognition of a vehicle. The controller includes a portable device having a communication function. A lighting device is arranged in the vehicle and has a vehicle entering mode and a vehicle exiting mode with changeable lighting patterns. A first controller and a second controller are connected to the lighting device and communicate with the portable device. The first controller illuminates the lighting device in the vehicle entering mode when communication with the portable device is established and changes the lighting pattern of the lighting device in the vehicle entering mode when a first condition is satisfied. The second controller illuminates the lighting device in the vehicle exiting mode when communication with the portable device is established and a second condition is satisfied.

13 Claims, 8 Drawing Sheets

Fig.1 (Prior Art)
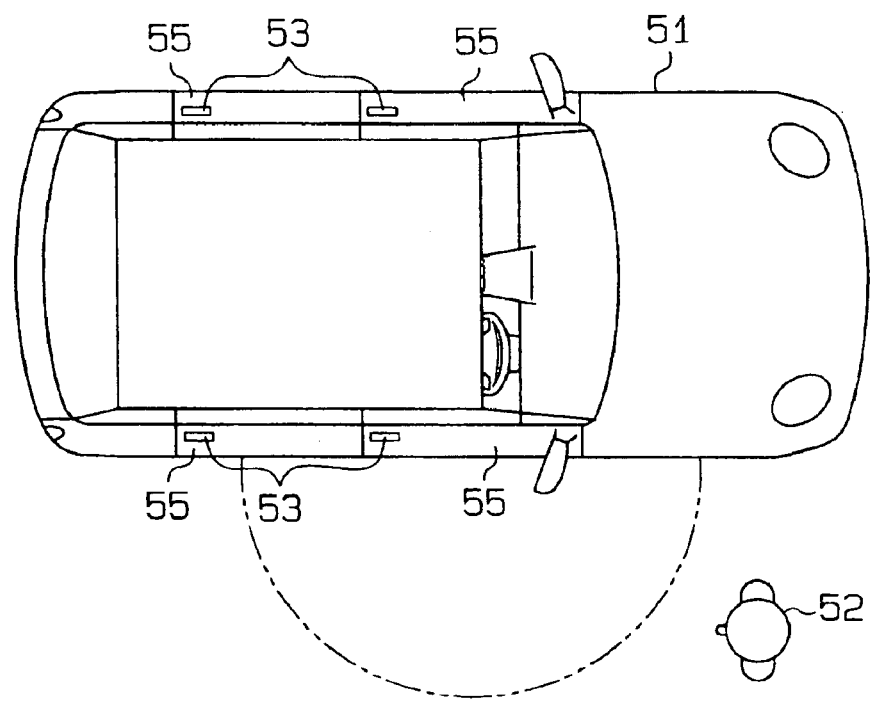
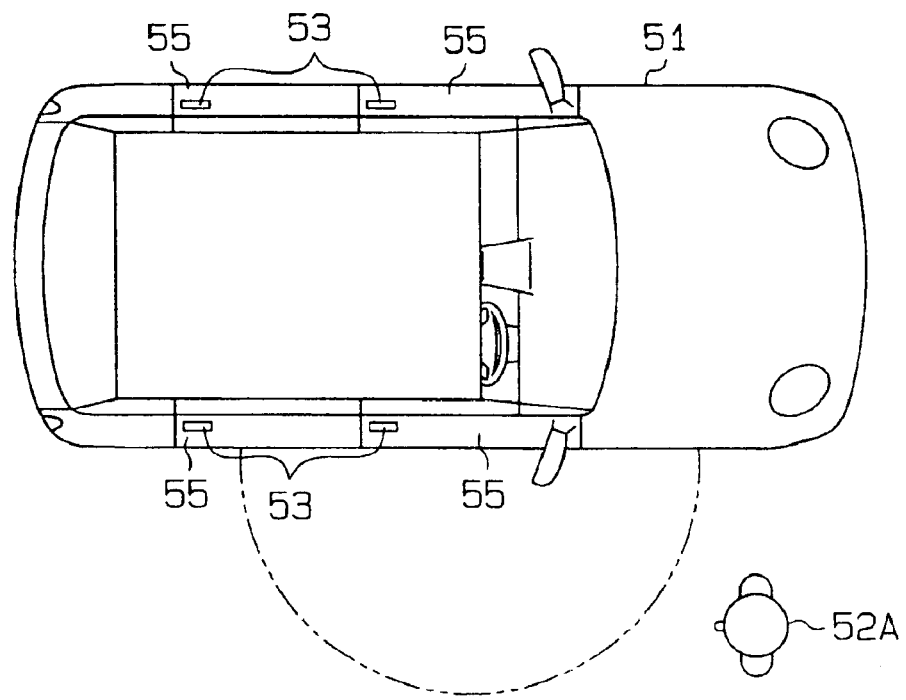

VEHICLE LIGHT CONTROLLER

BACKGROUND OF THE INVENTION

The present invention relates to a light controller for use in a vehicle.

In recent years, in addition to improvement in the basic performance and security of a vehicle, there is a demand for improving the operability of a vehicle. Accordingly, referring to FIG. 1, a vehicle light controller that lights a door handle 53 has been proposed (e.g., Japanese Laid-Open Patent Publication No. 10-35359). The door handle 53 is illuminated, for example, if an owner (driver) 52 carrying a portable device, which is provided with a communication function, approaches a vehicle 51 when the vehicle is parked in a dark location, such as an indoor parking lot. This enables the owner 52 to easily open the door 55 since the position of the door handle 53 can be seen.

However, a plurality of vehicles 51 equipped with substantially the same prior art vehicle light controller may be parked in the same parking lot. In such a case, when the respective owners 52 and 52A, who are each carrying the portable device, approaches the vehicles 51, the door handle 53 of each vehicle 51 would be illuminated at substantially the same time. Since the lights of the vehicles 51 are illuminated in the same manner, it may be difficult for the owners 52 and 52A to quickly recognize his or her vehicle 51.

SUMMARY OF THE INVENTION

One aspect of the present invention is a light controller for use in a vehicle. The light controller includes a portable device having a communication function. A lighting device is arranged in the vehicle and has a vehicle entering mode with changeable lighting patterns and a vehicle exiting mode. A first controller is connected to the lighting device for communicating with the portable device. The first controller illuminates the lighting device in the vehicle entering mode when communication with the portable device is established and changes the lighting pattern of the lighting device in the vehicle entering mode when a first condition is satisfied. A second controller is connected to the lighting device for communicating with the portable device. The second controller illuminates the lighting device in the vehicle exiting mode when communication with the portable device is established and a second condition is satisfied.

A further aspect of the present invention is a method for controlling the lighting of a lighting device arranged in a vehicle. The method includes establishing communication between a portable device, which has a communication function and which is carried by a driver, and a transceiver, which is arranged in the vehicle. The method further includes calculating the distance between the vehicle and the portable device, flashing the lighting device when the calculated distance enters a first range as the driver approaches the vehicle, and changing a lighting pattern of the lighting device when the calculated distance enters a second range that is smaller than the first range.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1 is a schematic plan view showing vehicles equipped with a transceiver of the prior art;

DETAILED DESCRIPTION OF THE PREFERRED EMBODIMENTS

Figure 2:
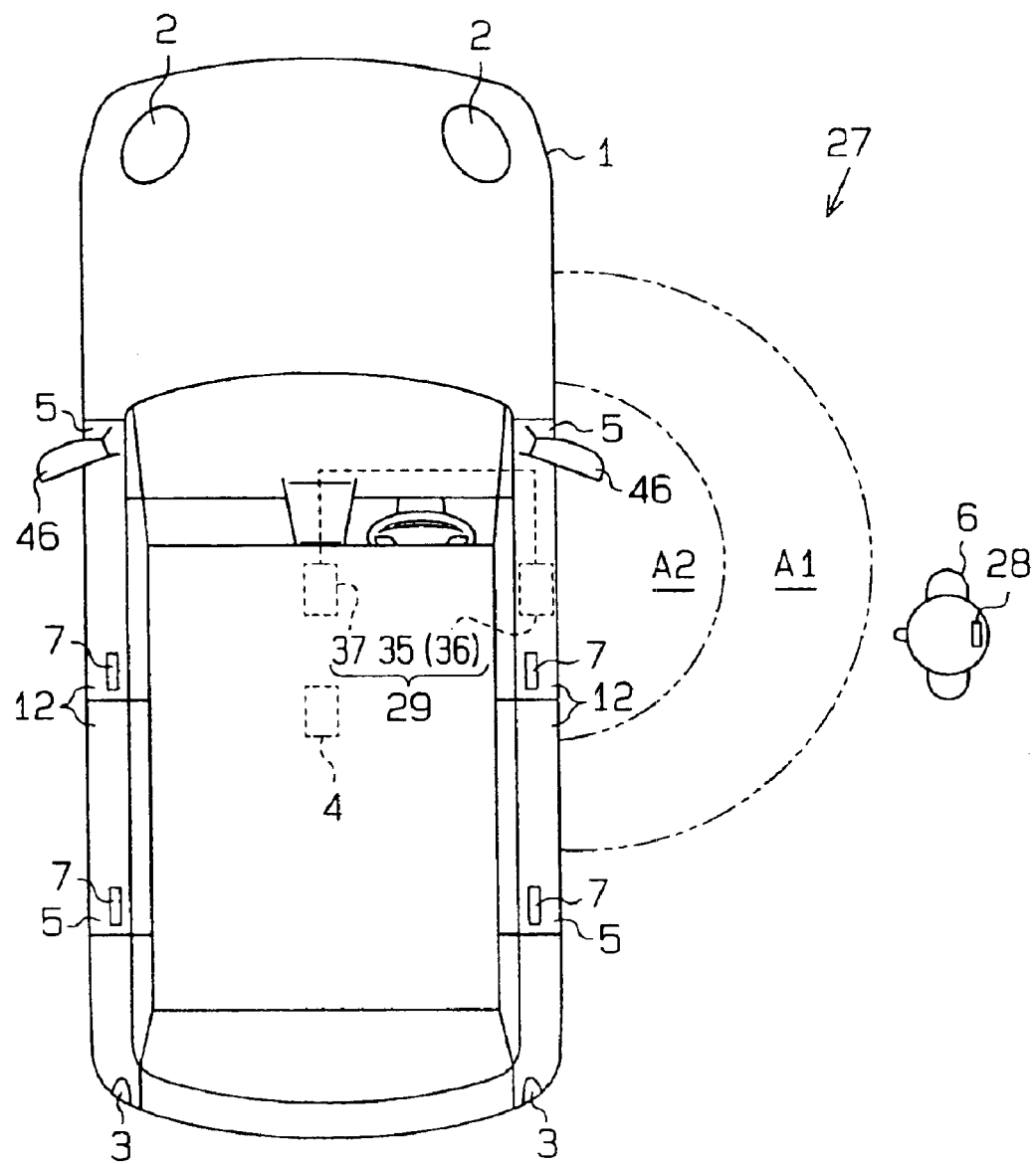
FIG. 2 is a schematic plan view showing a vehicle light controller according to a preferred embodiment of the present invention.

In the drawings, like numerals are used for like elements throughout.

FIG. 2 is a schematic plan view showing a vehicle light controller 27 according to a preferred embodiment of the present invention. As shown in FIG. 2, headlights 2 are arranged on the front portion of a vehicle 1, taillights 3 are arranged on the rear portion of the vehicle 1, and a passenger compartment light 4 is arranged in a passenger compartment of the vehicle 1. The lights 2, 3, and 4 each function as a lighting device.

The vehicle 1 has a plurality of doors 5 (four in the preferred embodiment). Each door 5 has a door handle (manipulated device) 7 that is used by a driver 6 or a passenger of the vehicle 1 to open the door 5.

Figure 5:
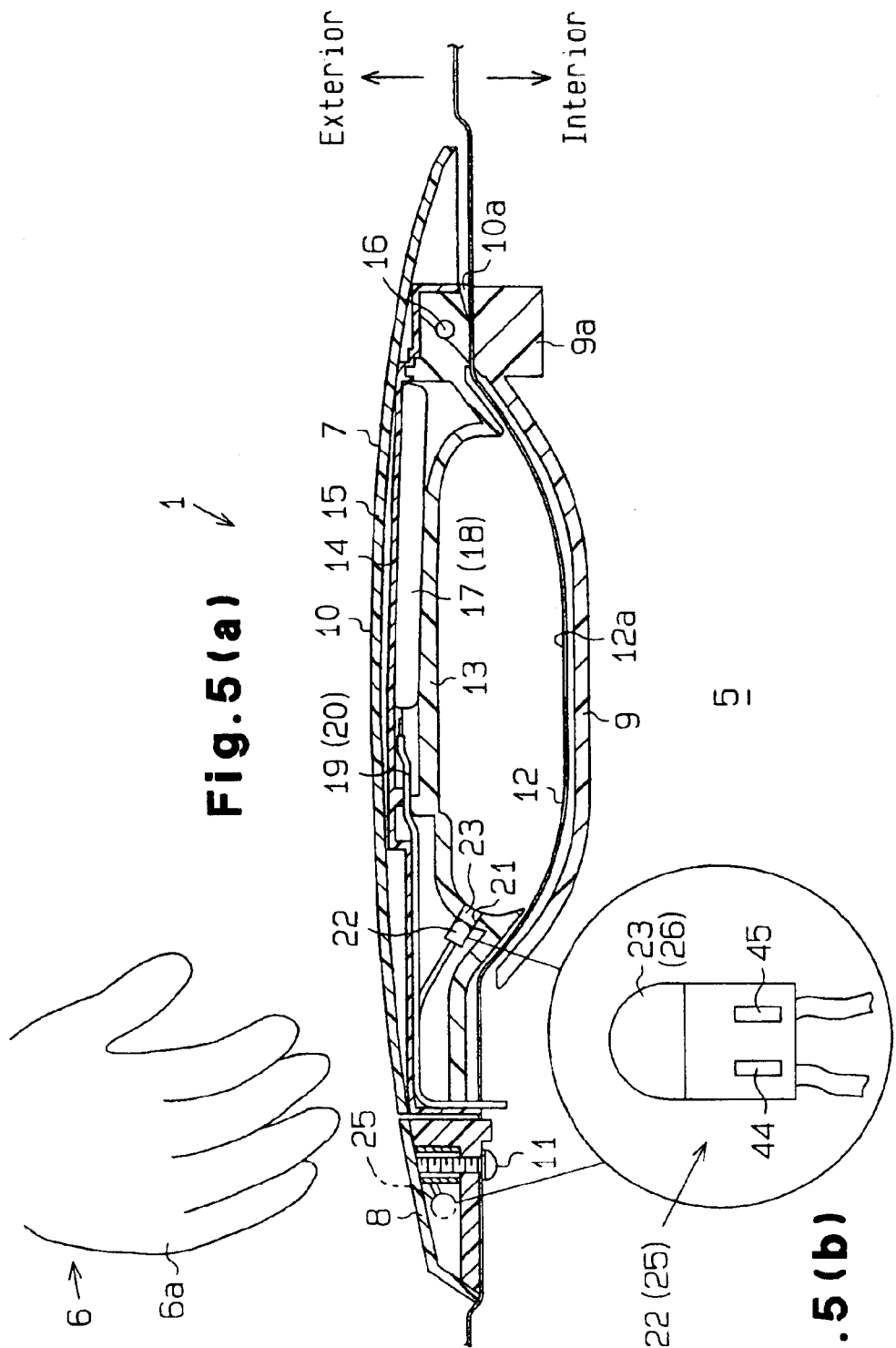
FIG. 5(a) is a cross-sectional view taken along line A—A in FIG. 3.
FIG. 5(b) is an enlarged front view showing a door light and a footlight arranged in the door handle of FIG. 5(a)

FIG. 5(a) is a cross-sectional view of the door handle 7. Hereafter, the description will be centered on the door 5 located on the driver's side (in this case, the front right door 5). As shown in FIG. 5(a), the door handle 7 includes an ornamental portion 8, a fastening portion 9, and a handle portion 10. The ornamental portion 8 is fixed to a door panel 12, which forms the door 5, by a screw 11. The fastening portion 9 includes a fastening piece 9a, and the handle portion 10 includes a connecting piece 10a. The fastening portion 9 and the handle portion 10 are fixed to the door panel 12 in a state in which the door panel 12 is held between the fastening piece 9a and the connecting piece 10a. The fastening portion 9 is arranged on the interior side of the door panel 12, and the ornamental portion 8 is arranged on the exterior side of the door panel 12. The door panel 12 is curved inward toward the passenger compartment to widen the space between the handle portion 10 and the door panel 12. The fastening portion 9 is formed to extend along the door panel 12.

The handle portion 10 includes a base 13, a frame 14, and a case 15. The base 13 is pivotally attached to the connecting piece 10a about a pivot shaft 16, which is inserted through the connecting piece 10a of the handle portion 10. A spring (not shown) urges the base 13 towards the door panel 12. Part of the base 13 is curved outward with respect to the passenger compartment to widen the space between the base 13 and the door panel 12. This enables the driver 6 to insert his or her hand 6a into the space between the base 13 and the door panel 12.

The frame 14 is connected to the outer side of the base 13. A transmission antenna 17 and a receiving antenna 18 are accommodated in a space defined between the frame 14 and the base 13. The transmission antenna 17 and the receiving antenna 18 are respectively connected to signal wires 19 and 20, which extend into the door 5. The frame 14 is covered by the case 15. The outer side of the case 15 is curved outward relative to the passenger compartment.

Figure 3:
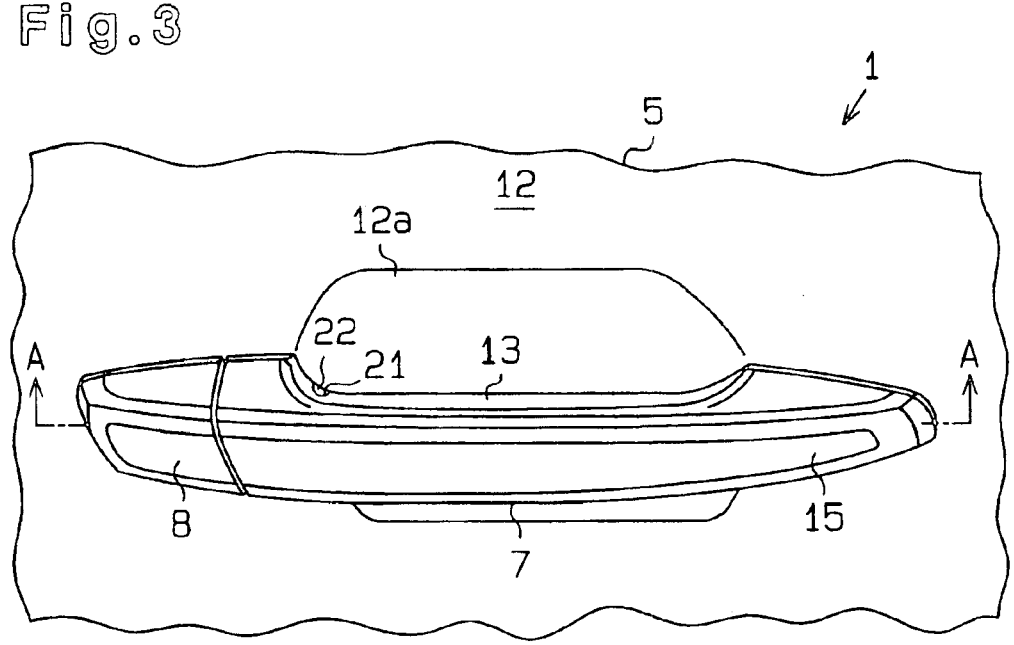
FIGS. 3 and 4 are perspective views each showing a door handle arranged in the vehicle of FIG. 2.

As shown in FIGS. 3 and 5(a), the base 13 has a light receptacle 21 facing towards a concave surface 12a formed in the door panel 12. The light receptacle 21 receives a door light 22, which functions as a lighting device and a door illuminating device. The door light 22 illuminates the concave surface 12a of the door panel 12. A lens 23 focused on the concave surface 12a is provided on the distal portion of the door light 22.

Figure 4:
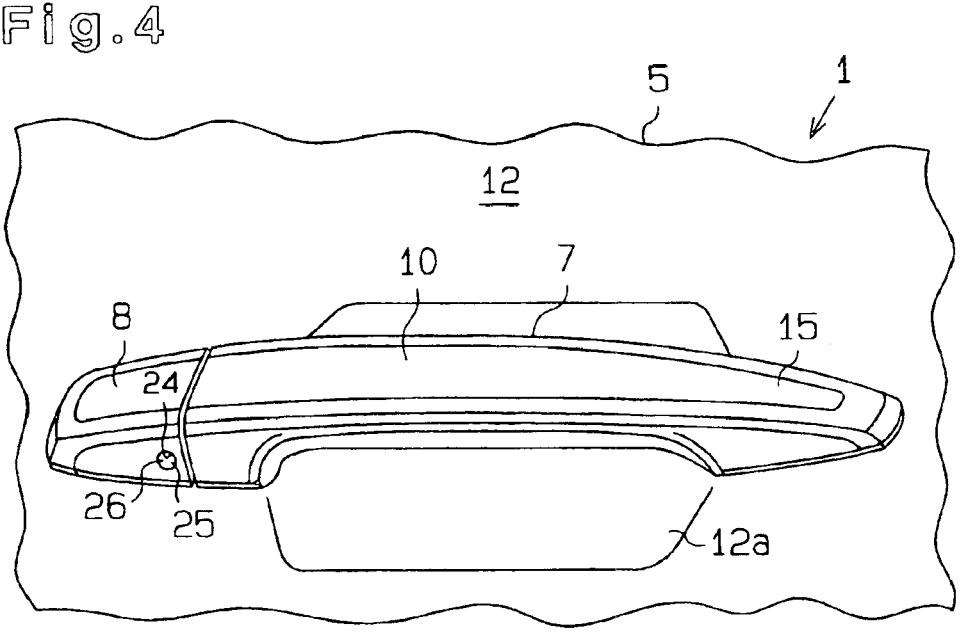

As shown in FIG. 4, a light receptacle 24 is formed in the lower surface of the ornamental portion 8. The light receptacle 24 receives a footlight 25, which functions as a lighting device and a foot illuminating device. The footlight 25 illuminates the ground near the door 5, or the area around the driver's feet. The footlight 25 includes a lens 26 focused on the ground near the door 5.

As shown in FIG. 5(b), the lens 23 is formed integrally with the distal portion of the door light 22, and a lens 26 is formed integrally with the distal portion of the footlight 25. The lights 22 and 25 each include a blue light-emitting diode (LED) 44 and a red LED 45. The color of the light emitted from each of the lights 22 and 25 may be changed by illuminating the LEDs 44 and 45 separately. Accordingly, each of the lights 22 and 25 is a multicolor light-emitting body that emits a blue light or a red light.

Figure 6:
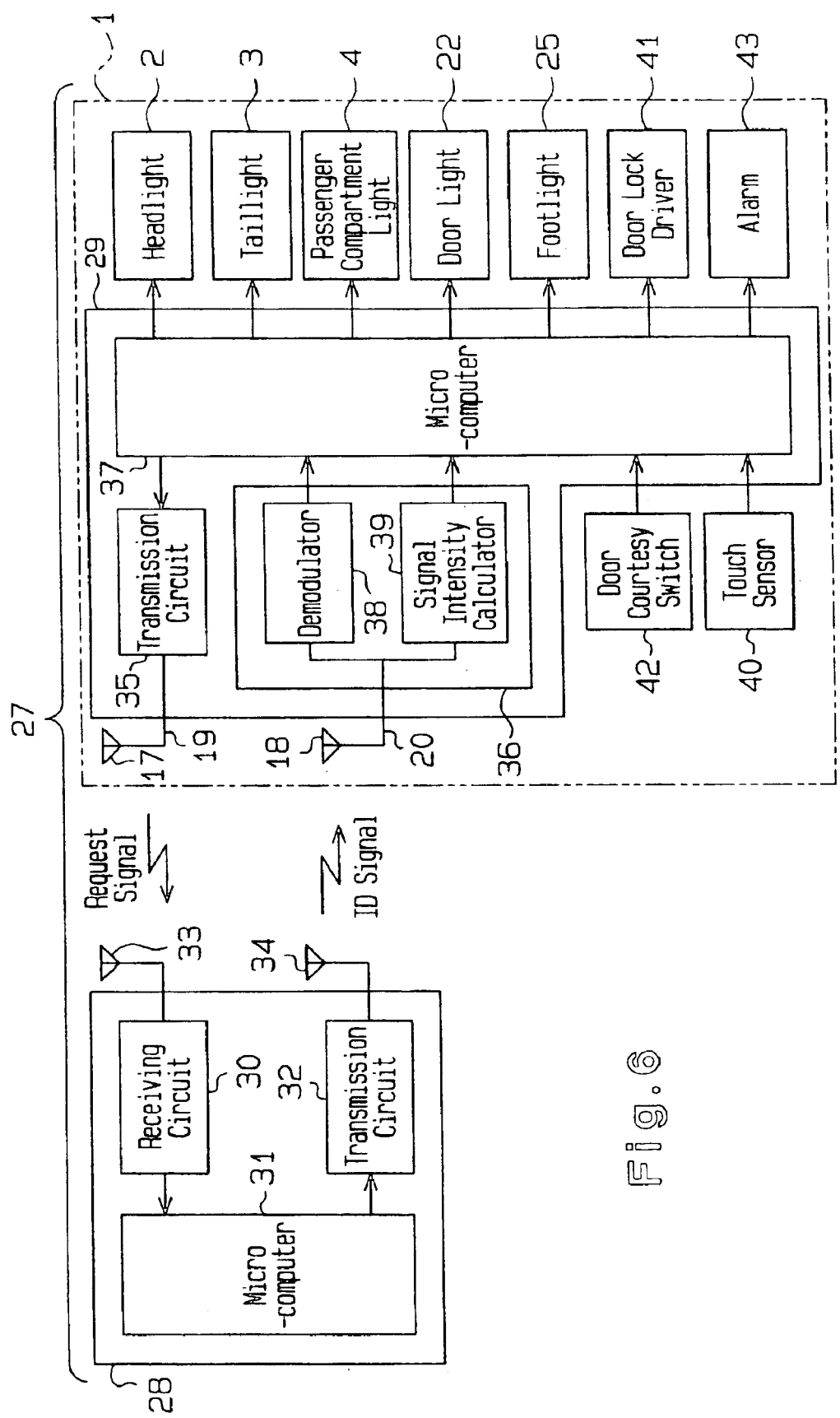
FIG. 6 is a schematic block diagram of the vehicle light controller.

Referring to FIG. 2, a transceiver 29 is installed in the vehicle 1. The driver 6 carries a portable device 28. The vehicle light controller 27 includes the transceiver 29 and the portable device 28. Referring to FIG. 6, the portable device 28 includes a receiving circuit 30, a vehicle microcomputer 31, and a transmission circuit 32.

The receiving circuit 30 receives a request signal from the transceiver 29 though an antenna 33, demodulates the request signal to a pulse signal, and provides the demodulated request signal to the vehicle microcomputer 31. When the request signal is received from the receiving circuit 30, the vehicle microcomputer 31 generates an ID signal, which includes a predetermined ID code. The transmission circuit 32 modulates the ID signal to a radio wave having a predetermined frequency and externally transmits the modulated ID signal through a transmission antenna 34.

The transceiver 29 includes a transmission circuit 35, a receiving circuit 36, and a vehicle microcomputer 37. The transmission circuit 35 transmits a request signal received from the vehicle microcomputer 37 through the signal wire 19 and the transmission antenna 17.

The receiving circuit 36 includes a demodulator 38 and a signal intensity calculator 39. The receiving circuit 36 receives the ID signal from the portable device 28 through the receiving antenna 18 and the signal wire 20. The demodulator 38 demodulates the ID signal to a pulse signal to generate a received signal and provides the vehicle microcomputer 37 with the received signal.

The signal intensity calculator 39 calculates the distance between the vehicle 1 and the portable device 28 based on the signal receiving intensity of the ID signal to generate a calculation signal and provides the vehicle microcomputer 37 with the calculation signal. More specifically, the signal intensity calculator 39 receives radio waves including the ID signal and detects the maximum voltage value of the detected radio waves. As the distance between the vehicle 1 and the portable device 28 decreases, the voltage value detected by the signal intensity calculator 39 increases. The signal intensity calculator 39 may also be used to detect the average voltage value or the minimum voltage value of the radio waves.

Referring to FIG. 2, in the preferred embodiment, the signal intensity calculator 39 generates a first calculation signal when the portable device 28 is located in communication range A1 and generates a second calculation signal when the portable device 28 is in communication range A2. Communication ranges A1 and A2 define different transmission ranges of the request signal. The area of transmission range A1 is greater than that of transmission range A2. The first and second calculation signals may be stored beforehand in a memory of the signal intensity calculator 39 in association with detected voltage values. In such a case, the signal intensity calculator 39 would not have to perform calculations to generate the first and second calculation signals each time the voltage value is detected.

Referring to FIG. 6, the headlights 2, the taillights 3, the passenger compartment light 4, the door light 22, and the footlight 25 are connected to the vehicle microcomputer 37. Further, a touch sensor 40, a door lock driver 41, a door courtesy switch 42, and an alarm (warning device) 43 are connected to the vehicle microcomputer 37.

The touch sensor 40 detects touching of the door handle 7 with the hand 6a and provides the vehicle microcomputer 37 with a detection signal. The door lock driver 41 includes an actuator used to lock and unlock the door 5. The actuator is driven by an electric signal. The door courtesy switch 42 provides the vehicle microcomputer 37 with a door open signal when the door 5 is opened. The alarm 43 intermittently gives off a warning in accordance with a warning signal provided from the vehicle microcomputer 37.

The vehicle microcomputer 37, which includes a central processing unit, a read only memory, and a random access memory (none shown), intermittently generates a request signal. The vehicle microcomputer 37 stores a predetermined ID code. When provided with the received signal, the vehicle microcomputer 37 compares the stored ID code with an ID code included in the received signal.

When the driver 6 approaches the vehicle 1 while carrying the portable device 28, the vehicle microcomputer 37 first receives the first calculation signal from the signal intensity calculator 39 if the two ID codes match. In this state, communication is established between the transceiver 29 of the vehicle 1 and the portable device 28. Thus, the vehicle microcomputer 37 flashes the headlights 2, the taillights 3, the passenger compartment light 4, the door light 22, and the footlight 25 at the same timing. The door light 22 and the footlight 25 flash in a blue color.

Further, if the vehicle microcomputer 37 then receives the second calculation signal from the signal intensity calculator 39 when the ID codes match, the vehicle microcomputer 37 provides the door lock driver 41 with an unlock signal. The door lock driver 41 unlocks each door 5 in accordance with the unlock signal. The vehicle microcomputer 37 also changes the lighting pattern of the headlights 2, the taillights 3, the passenger compartment light 4, the door light 22, and the footlight 25. In the preferred embodiment, the vehicle microcomputer 37 functions as a first controller that changes the lighting pattern to shorten the flashing interval of the lights 2, 3, 4, 22, and 25. When the vehicle microcomputer 37 receives a door open signal from the door courtesy switch 42, the vehicle microcomputer 37 stops flashing the lights 2, 3, 4, 22, and 25.

When the driver 6 gets out of the vehicle 1 and moves away, the vehicle microcomputer 37 stops receiving the second calculation signal and starts receiving the first calculation signal from the signal intensity calculator 39. In this state, the vehicle microcomputer 37 lengthens the flashing interval of the lights 2, 3, 4, 22, and 25 while providing the door lock driver 41 with the door lock signal. The door lock driver 41 locks each door 5 in accordance with the door lock signal. Accordingly, the vehicle lock controller functions as a smart entry device. The vehicle microcomputer 37 functions as a second controller that stops flashing the lights 2, 3, 4, 22, and 25 when it stops receiving the received signal from the demodulator 38 and the first calculation signal from the signal intensity calculator 39.

When the vehicle microcomputer 37 is not provided with the received signal, the first calculation signal, or the second calculation signal, that is, when communication is not established between the vehicle 1 and the portable device 28, the vehicle microcomputer 37 operates the door light 22 and the footlight 25 in a warning mode when a detection signal is received from the touch sensor 40.

The vehicle microcomputer 37 functions as a third controller that flashes the door light 22 and the footlight 25 in red during the warning mode. Further, the vehicle microcomputer 37 functions as a fourth controller that provides the alarm 43 with a warning signal. The alarm 43 intermittently gives off a warning toward the outside of the vehicle 1 in accordance with the warning signal. Accordingly, the red flashing of the door light 22 and the footlight 25 and the warning of the alarm 43 warns off a thief who touches the door handle 7.

Figure 7:
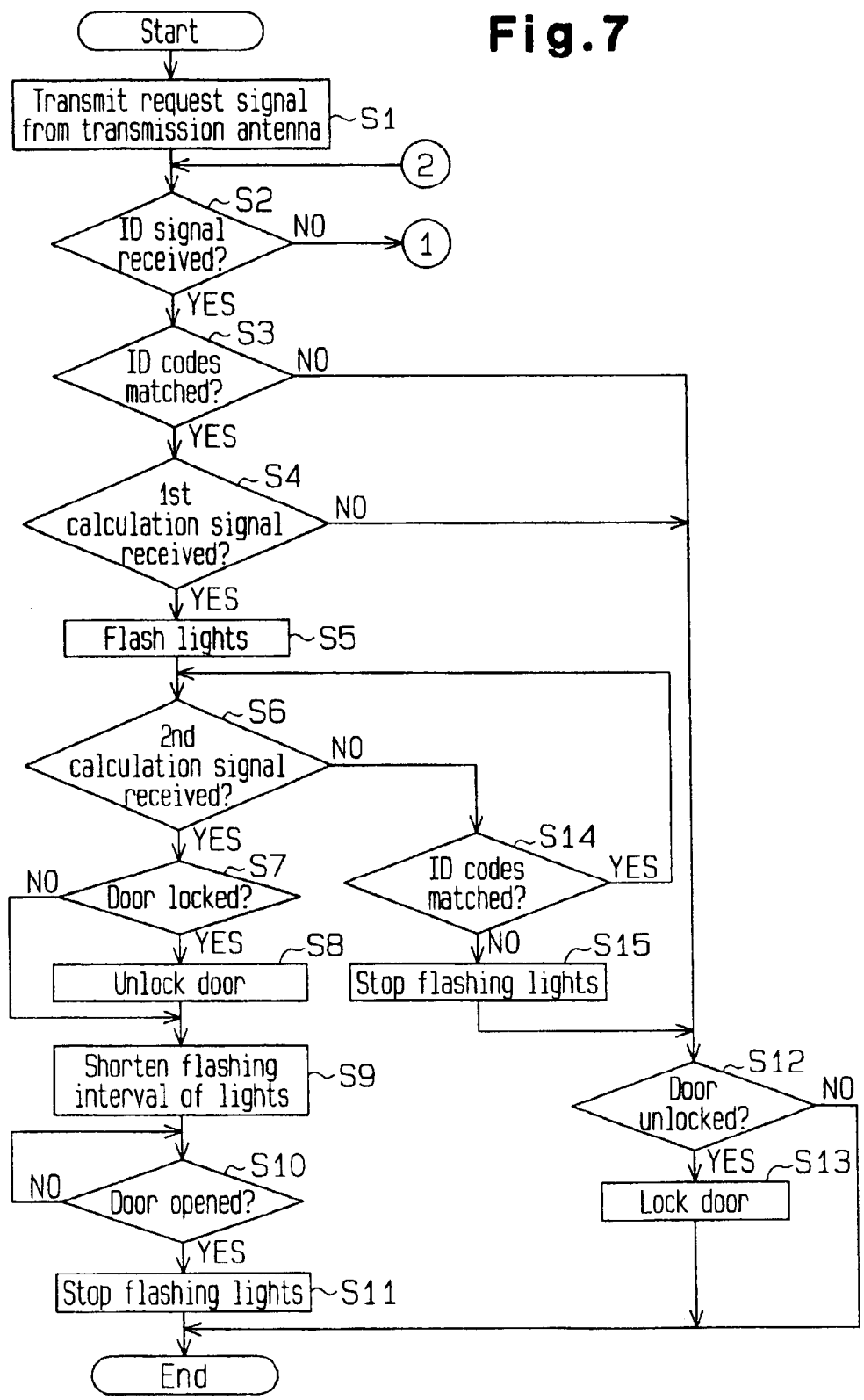
FIGS. 7 to 9 are flowcharts illustrating the operation of the vehicle light controller of FIG. 6.
Figure 8:
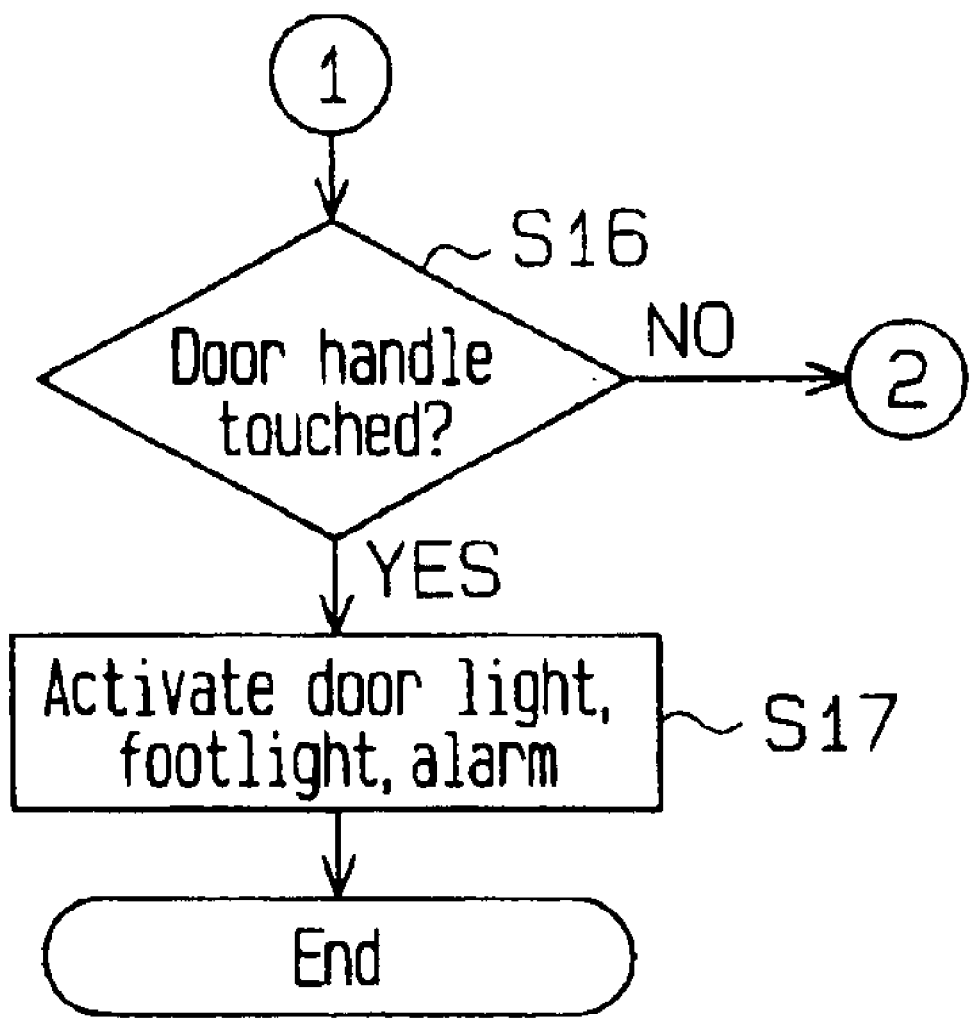

The series of processes performed by the portable device vehicle microcomputer 31 of the vehicle light controller 27 and the vehicle microcomputer 37 when a person tries to get into the vehicle 1 (vehicle entering mode) will now be discussed with reference to FIGS. 7 and 8.

The transmission antenna 17 of the transceiver 29 transmits a request signal in predetermined time intervals in the communication ranges A1 and A2 defined near the door 5 as shown in FIG. 2 (step S1). When the driver 6 enters the communication regions A1 and A2 while carrying the portable device 28, the portable device 28 receives the request signal from the transceiver 29. In response to the request signal, the portable device 28 transmits an ID signal to the transceiver 29. The portable device 28 is normally in a standby mode in which it is capable of receiving the request signal and transmits the ID signal in response to the request signal.

When the transceiver 29 receives the ID signal (YES in step S2), the ID codes of the ID code signal and the vehicle microcomputer 37 matches (YES in step S3) and the vehicle microcomputer 37 is provided with the first calculation signal from the signal intensity calculator 39 (YES in step S4). The vehicle microcomputer 37 flashes the lights 2, 3, 4, 22, and 25 when the vehicle microcomputer 37 determines that the portable device 28 is located in the communication range A1, which is shown in FIG. 2 (step S5). In this state, the door light 22 and the footlight 25 flash in blue. Then, when the vehicle microcomputer 37 receives the second calculation signal from the signal intensity calculator 39 (YES in step S6), the vehicle microcomputer 37 determines that the portable device 28 is located in the communication range A2. If the door 5 is locked (YES in step S7), the vehicle microcomputer 37 unlocks the door 5 (step S8) and shortens the flashing interval of the lights 2, 3, 4, 22, and 25 (step S9).

When the driver 6 opens the door 5 to get into the vehicle 1, the door courtesy switch 42 detects the opening of the door 5 (YES in step S10). Then, the vehicle microcomputer 37 stops flashing the lights 2, 3, 4, 22, and 25 (step S11). In this manner, the lights 2, 3, 4, 22, and 25 keep flashing until the door 5 is opened. Alternatively, the flashing of the lights 2, 3, 4, 22, and 25 may be stopped when the driver 6 gets into the vehicle 1 and operates the ignition switch.

When the ID codes of the ID signal and the vehicle microcomputer 37 do not match (NO in step S3) or when the vehicle microcomputer 37 does not receive the first calculation signal (NO in step S4) and the door 5 is unlocked (YES in step S12), the door 5 is locked (step S13). When the vehicle microcomputer 37 does not receive the second calculation signal from the signal intensity calculator 39 (NO in step S6) and the ID codes do not match (NO in step S14), the vehicle microcomputer 37 stops flashing the lights 2, 3, 4, 22, and 25 (step S15) and proceeds to steps S12 and S13.

When the transceiver 29 does not receive the ID signal (NO in step S2) and the door handle 7 is touched by a person's hand 6a (YES in step S16), the door light 22 and the footlight 25 are flashed in red and the alarm 43 gives off a warning (step S17). When the ID signal is not received (NO in step S2), the processes of steps S2 and S16 are repeated until the transceiver 29 receives the ID signal.

The processes that are performed when the driver 6 gets out of the vehicle 1 (vehicle exiting mode) will now be discussed.

Figure 9:
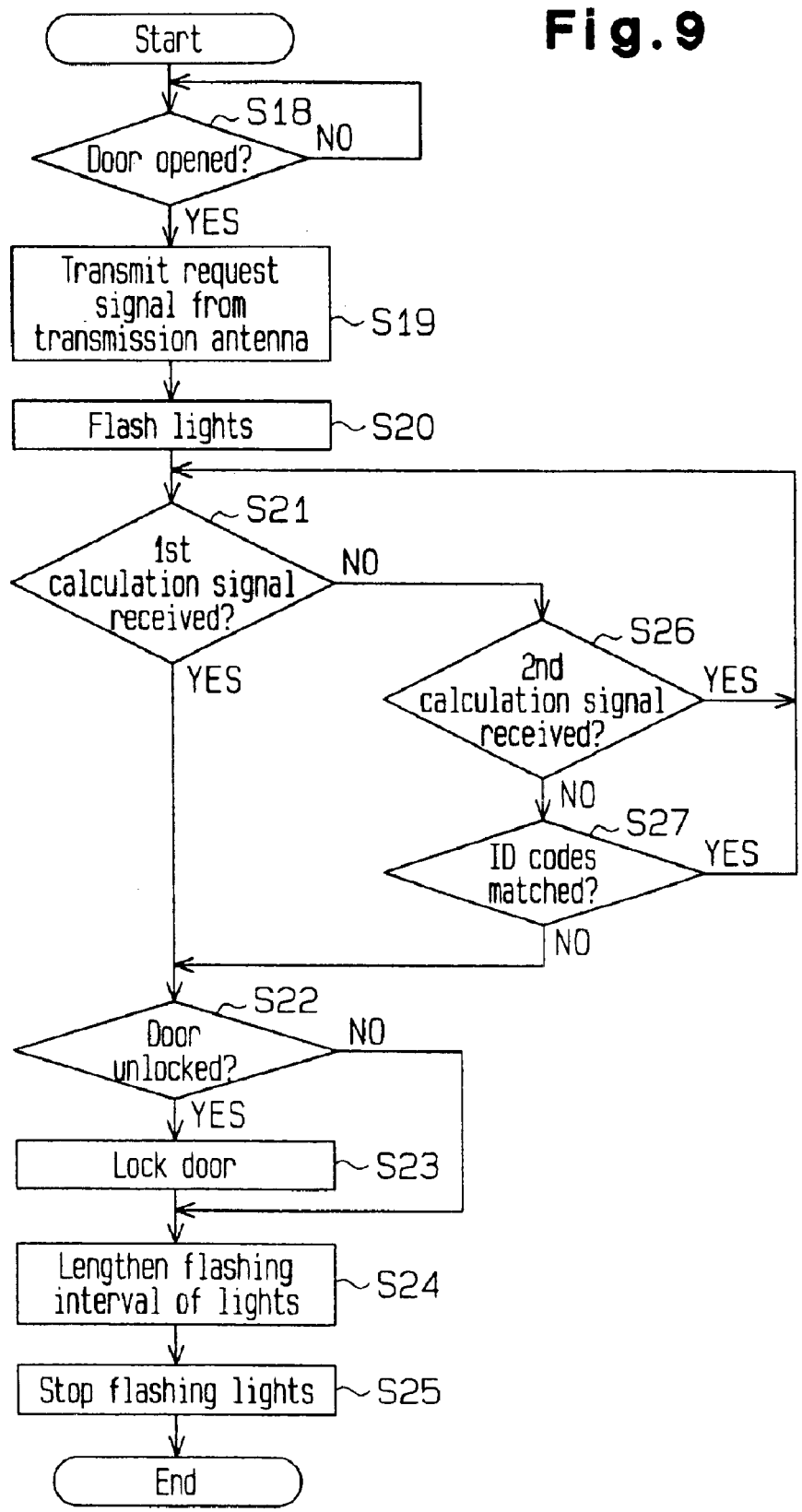

Referring to FIG. 9, when the driver 6 opens the door 5 to get out of the vehicle 1, the door courtesy switch 42 detects the opening of the door 5 (YES in step S18). Then, the transceiver 29 transmits the request signal to the communication ranges A1 and A2 through the transmission antenna 17 (step S19). Further, the lights 2, 3, 4, 22, and 25 are flashed (step S20).

When the vehicle microcomputer 37 receives the first calculation signal from the signal intensity calculator 39 (YES in step S21), the vehicle microcomputer 37 determines that the portable device 28 has entered the communication range A1 from the communication range A2. If the door 5 is unlocked (YES in step S22), the vehicle microcomputer 37 locks the door 5 (step S23). Then, the flashing interval of the lights 2, 3, 4, 22, and 25 is gradually lengthened (step S24). When the vehicle microcomputer 37 stops receiving the first calculation signal and the received signal, the flashing of the lights 2, 3, 4, 22, and 25 is stopped (step S25). The processes of steps S22 and S23 may be performed simultaneously with the process of step S25.

When the vehicle microcomputer 37 does not receive the first calculation signal from the signal intensity calculator 39 (NO in step S21), if the vehicle microcomputer 37 receives the second calculation signal from the signal intensity calculator 39 (YES in step S26) or if the ID codes of the ID signal and the vehicle microcomputer 37 match (YES in step S27), the processes of steps S22 to S25 are not performed.

The advantages of the vehicle light controller 27 in the preferred embodiment will now be discussed.

(1) In accordance with the first calculation signal and the second calculation signal from the signal intensity calculator 39, the vehicle microcomputer 37 changes the flashing interval of the headlights 2, the taillights 3, the passenger compartment light 4, the door light 22, and the footlight 25. If the vehicle 1 is parked near another vehicle that is equipped with substantially the same vehicle light controller as the vehicle light controller 27 and each vehicle light controller 27 flashes the lights 2, 3, 4, 22, and 25, the driver 6 easily recognizes his or her vehicle 1 since the flashing interval of the lights 2, 3, 4, 22, and 25 of the vehicle 1 becomes shorter than that of the other vehicle when approaching the vehicle 1.

(2) When a thief performs an unauthorized action against the vehicle 1, such as trying to open the door 5, the vehicle microcomputer 37 flashes the door light 22 and the footlight 25 in red and activates the alarm 43 to give off a warning. The red flashing of the door light 22 and the footlight 25 and the warning sound of the alarm 43 warns off a thief and improves the security of the vehicle 1.

(3) When communication is not established between the transceiver 29 of the vehicle 1 and the portable device 28, the flashing of the lights 2, 3, 4, 22, and 25 is stopped. Since the flashing of the lights 2, 3, 4, 22, and 25 is stopped when unnecessary, battery power consumption of the vehicle 1 and the portable device 28 is reduced. Further, since the lights 2, 3, 4, 22, and 25 are flashed, the power consumption in the battery of the vehicle 1 is reduced in comparison to when the lights 2, 3, 4, 22, and 25 are continuously illuminated.

(4) As the driver 6 who is holding the portable device 28 approaches the vehicle 1 to get into the vehicle, the flashing interval of the lights 2, 3, 4, 22, and 25 becomes shorter. As the driver 6 who is holding the portable device 28 gets out of the vehicle 1 and moves away, the flashing interval of the lights 2, 3, 4, 22, and 25 become longer. As the driver 6 moves further away and communication between the vehicle 1 and the portable device 28 is no longer established, the lights 2, 3, 4, 22, and 25 stop flashing. The flashing interval of the lights 2, 3, 4, 22, and 25 changes only when the driver 6 moves. This reassures the driver 6 of whether the door 5 is locked or unlocked.

(5) The lens 23 focused on the concave surface 12a of the door panel 12 is formed integrally with the door light 22, and the lens 26 focused on the ground is formed integrally with the footlight 25. Thus, there is no need for preparing a plurality of molds, for example, one for the lights 22 and 25 and another for the lenses 23 and 26. This reduces the manufacturing cost of the door handle 7.

It should be apparent to those skilled in the art that the present invention may be embodied in many other specific forms without departing from the spirit or scope of the invention. Particularly, it should be understood that the present invention may be embodied in the following forms.

The elapsed time from when the headlights 2, the taillights 3, the passenger compartment light 4, the door light 22, and the footlight 25 start flashing may be measured by a timer to change the flashing interval of the lights 2, 3, 4, 22, and 25 in accordance with the elapsed time.

When receiving the second calculation signal from the signal intensity calculator 39, the vehicle microcomputer 37 may lengthen the flashing interval of the headlights 2, the taillights 3, the passenger compartment light 4, the door light 22, and the footlight 25.

When the vehicle microcomputer 37 receives the second calculation signal from the signal intensity calculator 39, the color of the light emitted from the door light 22 and the footlight 25 may be changed to another color, such as red, green, or white. Further, the color of the light emitted from the flashing door light 22 and the footlight 25 may differ when getting into and out of the vehicle 1.

When the vehicle microcomputer 37 receives the second calculation signal from the signal intensity calculator 39, the brightness of the headlights 2, the taillights 3, the passenger compartment light 4, the door light 22, and the footlight 25 may be increased or decreased from when the signal intensity calculator 39 receives the first calculation signal. The lights 2, 3, 4, 22, and 25 do not necessarily have to be flashing when the brightness is changed.

When receiving the first calculation signal from the signal intensity calculator 39, the vehicle microcomputer 37 may continuously illuminate the headlights 2, the taillights 3, the passenger compartment light 4, the door light 22, and the footlight 25. In this case, the lights 2, 3, 4, 22, and 25 may start flashing when the vehicle microcomputer 37 receives the second calculation signal from the signal intensity calculator 39.

Alternatively, the vehicle microcomputer 37 may flash the headlights 2, the taillights 3, the passenger compartment light 4, the door light 22, and the footlight 25 when receiving the first calculation signal from the signal intensity calculator 39. Further, the lights 2, 3, 4, 22, and 25 may be illuminated continuously from when the vehicle microcomputer 37 receives the second calculation signal from the signal intensity calculator 39.

The flashing interval of the lights may gradually be shortened or lengthened as the driver 6 carrying the portable device 28 approaches the vehicle 1.

The area of communication range A2 of FIG. 2 may be greater than that of the communication range A1 or the same as communication range A1.

The flashing may be limited to the door light 22 and the footlight 25 of the driver side door 5. In this case, the headlights 2, the taillights 3, the passenger compartment light 4, and the lights 22 and 25 of the other doors 5 are not flashed. This reduces battery power consumption.

When the door courtesy switch 42 detects the opening of the door 5, the vehicle microcomputer 37 may activate the lights 22 and 25 and the alarm 43.

The touch sensor 40 may be arranged on a door mirror 46 (FIG. 2). In this case, the lights 22 and 25 and the alarm 43 may be activated when the touch sensor 40 detects the touching of the door mirror 46.

Further, a vibration detection sensor may be installed in the vehicle 1. In this case, the vehicle microcomputer 37 activates the lights 22 and 25 and the alarm 43 when the vibration detection sensor detects vibrations caused by discharging air from a tire or by breaking a window.

The hazard light or footlights located in the lower portions of left and right door mirrors may be used as the lighting device. Further, bumper lights arranged in the front and rear bumper and fender lights arranged in the fender may be used as the lighting device.

Either the door light 22 or the footlight 25 may be eliminated. Alternatively, the door light 22 and the footlight 25 may be formed from the same light source. In this case, the concave surface 12a of the door panel 12 and the ground near the door 5 are both illuminated. This decreases the number of components for the door handle 7 and reduces the manufacturing cost of the handle 7.

The lenses 23 and 26 may be eliminated.

At least one of the door light 22 and the footlight 25 may be formed to emit light in only one color.

The vehicle light controller 27 may be applied to a keyless entry device that locks and unlocks doors when operating switches are arranged on the portable device 28. In such a case, for example, the operation of a switch flashes the headlights 2, the taillights 3, the passenger compartment light 4, the door light 22, and the footlight 25. Further, as the driver 6 enters the communication range A2 from the communication range A1, the flashing interval of the lights 2, 3, 4, 22, and 25 is shortened.

The present examples and embodiments are to be considered as illustrative and not restrictive, and the invention is not to be limited to the details given herein, but may be modified within the scope and equivalence of the appended claims.

What is claimed is:

1. A light controller for use in a vehicle, the light controller comprising:
    a portable device having a communication function;
    a lighting device arranged in the vehicle and having a vehicle entering mode with changeable lighting patterns and a vehicle exiting mode;
    a first controller connected to the lighting device for communicating with the portable device, the first controller illuminating the lighting device in the vehicle entering mode when communication with the portable device is established and changing the lighting pattern of the lighting device in the vehicle entering mode when a first condition is satisfied; and
    a second controller connected to the lighting device for communicating with the portable device, the second controller illuminating the lighting device in the vehicle exiting mode when communication with the portable device is established and a second condition is satisfied.

2. The light controller according to claim 1, wherein the lighting device has a warning mode, the light controller further comprising:
    a third controller connected to the lighting device for communicating with the portable device, the third controller illuminating the lighting device in the warning mode when communication with the portable device is not established and an unauthorized action is taken against the vehicle.

3. The light controller according to claim 1, wherein the lighting pattern of the lighting device that is changed in the vehicle entering mode is at least one of an emitted light color pattern, a flashing time pattern, and a brightness pattern.

4. The light controller according to claim 2, wherein the vehicle includes a warning device for issuing a warning when an unauthorized action is performed against the vehicle, and the third controller flashes the lighting device in red during the warning mode, the light controller further comprising:
    a fourth controller connected to the warning device to control the warning device.

5. The light controller according to claim 1, wherein the second controller flashes the lighting device at intervals that is gradually increased during the vehicle exiting mode and stops illuminating the lighting device when communication is no longer established with the portable device.

6. The light controller according to claim 1, wherein the lighting pattern is changeable in the vehicle exiting mode, and the first and second controllers look and unlock a door of the vehicle when changing the lighting pattern of the lighting device in the vehicle entering mode or the vehicle exiting mode.

7. The light controller according to claim 1, further comprising:
    a calculator connected to the first and second controller, wherein the calculator generates a calculation signal by calculating the distance between the vehicle and the portable device based on signal intensity of a communication signal transmitted from the portable device;
    the first controller changing the lighting pattern of the lighting device during the vehicle entering mode in accordance with the calculation signal; and
    the second controller changing the lighting pattern of the lighting device during the vehicle exiting mode in accordance with the calculation signal.

8. The light controller according to claim 1, wherein the vehicle includes a door, and a manipulated device arranged in the door and manipulated to open and close the door, the lighting device including a door light arranged on the manipulated device to illuminate a surface of the door.

9. The light controller according to claim 1, wherein the vehicle includes a door, and a manipulated device arranged in the door and manipulated to open and close the door, the lighting device including a footlight arranged on the manipulated device to illuminate the ground near the door.

10. The light controller according to claim 9, wherein the footlight includes a lens focused towards the ground.

11. The light controller according to claim 1, wherein the vehicle includes a door, and a manipulated device arranged in the door and manipulated to open and close the door, the lighting device including a door light arranged on the manipulated device to illuminate a surface of the door, and a footlight arranged on the manipulated device to illuminate the ground near the door.

12. The light controller according to claim 11, wherein at least one of the door light and the footlight is a light-emitting diode.

13. The light controller according to claim 11, wherein at least one of the door light and the footlight is a multicolor light-emitting body.

* * * * *

UNITED STATES PATENT AND TRADEMARK OFFICE
CERTIFICATE OF CORRECTION

| | |
|---|---|
| PATENT NO. | : 6,949,882 B2 |
| DATED | : September 27, 2005 |
| INVENTOR(S) | : Terumasa Suyama et al. |

It is certified that error appears in the above-identified patent and that said Letters Patent is hereby corrected as shown below:

Column 10,
Line 6, delete "look", and insert -- lock --.

Signed and Sealed this

Tenth Day of January, 2006

JON W. DUDAS
*Director of the United States Patent and Trademark Office*